United States Patent
Malov

(10) Patent No.: US 8,170,905 B2
(45) Date of Patent: May 1, 2012

(54) SYSTEM AND METHOD DETERMINING REFERENCE VALUES OF SENSITIVITIES AND CLIENT STRATEGIES BASED ON PRICE OPTIMIZATION

(75) Inventor: Denis Malov, Scottsdale, AZ (US)

(73) Assignee: SAP AG, Walldorf (DE)

( * ) Notice: Subject to any disclaimer, the term of this patent is extended or adjusted under 35 U.S.C. 154(b) by 1185 days.

(21) Appl. No.: 11/948,082

(22) Filed: Nov. 30, 2007

(65) Prior Publication Data

US 2009/0144101 A1 Jun. 4, 2009

(51) Int. Cl.
*G06F 9/46* (2006.01)
(52) U.S. Cl. .................................... 705/7.29
(58) Field of Classification Search .................. 705/7.29
See application file for complete search history.

(56) References Cited

U.S. PATENT DOCUMENTS

| 7,379,890 B2 * | 5/2008 | Myr et al. | 705/7.35 |
| 2004/0024674 A1 * | 2/2004 | Feldman | 705/36 |

OTHER PUBLICATIONS

"The impacts of price responsiveness on strategic equilibrium in competitive electricity markets", Jun. 2007 International Journal of Electrical Power & Energy Systems, vol. 29, Issue 5, pp. 397-407.*
Scriven et al "The South Bank Pricing Tests", Aug. 1998, Report 5 for Corporate members, pp. 1-25.*

* cited by examiner

*Primary Examiner* — Romain Jeanty
(74) *Attorney, Agent, or Firm* — Buckley, Maschoff & Talwalker LLC

(57) ABSTRACT

A computer implemented method for determining the reference values of sensitivities and strategies for price optimization demand models from a profit function and current product price. A total profit objective is expressed as the maximization of profit and volume, where a strategy parameter represents the relationship between profit and volume. From the total profit objective, the bounds of the strategy parameter are expressed as conditional inequalities relating the bounds to functions of the unit profit at the current rate and average volume. The strategy parameter is then set to the average of these bounds. The reference elasticity is expressed as a function of the unit profit function and average volume. The resulting reference values can be used in a price optimization system to generate recommended prices that relate to an industry's current pricing scheme.

27 Claims, 3 Drawing Sheets

| PRODUCT ID | CURRENT PRICE | $\pi_0(r)$ | $\dfrac{d\pi_0}{dr}(r)$ | $\dfrac{d^2\pi_0}{dr^2}(r)$ | $\lambda$ min | $\lambda$ max | $\lambda$ ref | $\beta$ ref |
|---|---|---|---|---|---|---|---|---|
| 113221 | 7.95 | 245 | 10.1 | 1.43 | 0.65 | 0.87 | 0.71 | 1.53 |
| 113222 | 8.35 | 479 | 9.4 | 0.93 | 0.37 | 0.76 | 0.71 | 1.24 |
| 113223 | 10.42 | 561 | 11.6 | 1.06 | 0.49 | 0.93 | 0.71 | 0.89 |
| ... | ... | ... | ... | ... | ... | ... | ... | ... |

FIG. 3

SYSTEM AND METHOD DETERMINING REFERENCE VALUES OF SENSITIVITIES AND CLIENT STRATEGIES BASED ON PRICE OPTIMIZATION

FIELD OF THE INVENTION

The present invention relates in general to economic modeling and, more particularly, to a system and method of determining reference values of sensitivities and client strategies based on price optimization.

BACKGROUND OF THE INVENTION

Economic and financial modeling and planning is commonly used to estimate or predict the performance and outcome of real systems given specific sets of input data of interest. A model is a mathematical expression or representation which predicts the outcome or behavior of the system under a variety of conditions. In one sense, it is relatively easy to review historical data, understand its past performance, and state with relative certainty that the system's past behavior was indeed driven by the historical data. A much more difficult task, but one that is extremely valuable, is to generate a mathematical model of the system which predicts how the system will behave, or would have behaved, with different sets of data and assumptions. While forecasting and backcasting using different sets of input data is inherently imprecise, i.e., no model can achieve 100% certainty. The field of probability and statistics has provided many tools which allow such predictions to be made with reasonable certainty and acceptable levels of confidence.

In its basic form, the economic model can be viewed as a predicted or anticipated outcome of a mathematical expression as driven by a given set of input data and assumptions. The input data is processed through the mathematical expression representing either the expected or current behavior of the real system. The mathematical expression is formulated or derived from principles of probability and statistics, often by analyzing historical data and corresponding known outcomes, to achieve a best fit of the expected behavior of the system to other sets of data, both in terms of forecasting and backcasting. In other words, the model should be able to predict the outcome or response of the system to a specific set of data being considered or proposed, within a level of confidence, or an acceptable level of uncertainty. As a simple test of the quality of the model, if historical data is processed through the model and the outcome of the model, using the historical data, is closely aligned with the known historical outcome, then the model is considered to have a high confidence level over the interval. The model should then do a good job of predicting outcomes of the system to different sets of input data.

The process of setting the interest rates or prices for retail bank deposit and loan accounts is an essential task in a financial services institution. Recently, large financial institutions have started using sophisticated analytics and modeling to understand demand trends and uncover areas of profit opportunity. Automated pricing software represents a movement toward greater precision in the pricing process. The new technology relies on complex demand models to estimate customers' attitudes toward price and the elasticity of demand from historical sales data.

One of the most difficult problems in demand modeling is the existence of products that have little or no historical data available. A similar problem is when there are no price changes in the sales history of a product, or if a price does change it is associated with a promotion, a competitor price move, or a cost change. In the latter case, there is little information about the effect of pure price changes on consumer demand. This lack of information makes traditional regression analysis very unstable and can result in a large number of incorrect price elasticities.

One possible solution to this problem is a statistical method called Bayesian inference. Bayesian inference is a method of determining stable and robust estimates of parameters by taking into consideration the learning from prior distributions of the corresponding parameter estimates. Generally speaking, Bayesian inference methods require the knowledge of a-priori guesses for the model parameters. Such guesses define what is known about the model parameters prior to observing the data used for modeling. During the modeling process, these guesses are then used in a way similar to "attractor points" for the parameters estimated by demand models, thus stabilizing the modeling process. Such methods can be thought of as a mathematical approach to mixing facts (the data) with educated guesses (the priors). The quality of such Bayesian priors is very important for the quality of the final estimates of model parameters.

Stability is one of the main advantages of Bayesian modeling methods. In the total absence of information (i.e., zero statistical content of the data), the model parameters will reproduce exactly the Bayesian priors. In the ideal case, where there is an infinite amount of data with infinite information content, the value of the Bayesian priors has no effect on the final value of the model parameters. In practice, the data is noisy with limited statistical information in it. For such cases the value of the model parameters will reflect a trade off between the statistical content of the data and the Bayesian priors, hence the quality of such priors is extremely important for the quality of the resulting model.

There are some existing techniques of determining Bayesian priors. One classic technique is to use expert opinion for the value of priors. The expert opinion may be obtained from professionals in the field who have studied some aspect of the modeling objects in question. Another technique uses aggregated values from a related, larger data set to determine the priors.

However, these traditional techniques may not be feasible or efficient in determining Bayesian priors for price elasticity in a retail banking environment where one would like to systematically, automatically and quickly obtain the priors for a large number of products. In some cases, the expert option is too expensive to obtain or simply not available in time for thousands of financial products. In other cases, even the related data set is difficult to find, for example, when a new product line is introduced and hence no historical data can be used as reference.

There is a need for a method of determining Bayesian priors for price elasticity that is efficient, economical, and reliable.

SUMMARY OF THE INVENTION

One embodiment is a computer implemented method for determining the reference values of a demand model comprising providing a current rate of a first product, providing a first reference elasticity for the first product as a function of a unit profit function of the first product with respect to the current rate and an average volume of the first product, wherein the function further includes a constant of proportionality between the unit profit function and the average volume, expressing a first bound of the constant of proportionality as a first conditional inequality relating the first bound to a function of the unit profit function and the average volume, expressing a second bound of the constant of proportionality as a second conditional inequality relating the second bound to a function of the unit profit function and the average volume, solving for the first bound and the second bound, estimating the constant of proportionality to be an average of the first bound and the second bound, and solving for the first reference elasticity.

Another embodiment is a method of providing a computer demand model having a reference value, comprising providing a current rate of a first product, providing a first reference elasticity for the first product as a function of a unit profit function of the first product with respect to the current rate and an average volume of the first product, wherein the function further includes a constant of proportionality between the unit profit function and the average volume, expressing a first bound of the constant of proportionality as a first conditional inequality relating the first bound to a function of the unit profit function and the average volume, expressing a second bound of the constant of proportionality as a second conditional inequality relating the second bound to a function of the unit profit function and the average volume, solving for the first bound and the second bound, estimating the constant of proportionality to be an average of the first bound and the second bound, and solving for the first reference elasticity.

Yet another embodiment is a computer program product usable with a programmable computer processor having a computer readable program code embodied therein, comprising a computer readable program code which provides a current rate of a first product, a computer readable program code which provides a first reference elasticity for the first product as a function of a unit profit function of the first product with respect to the current rate and an average volume of the first product, wherein the function further includes a constant of proportionality between the unit profit function and the average volume, a computer readable program code which expresses a first bound of the constant of proportionality as a first conditional inequality relating the first bound to a function of the unit profit function and the average volume, a computer readable program code which expresses a second bound of the constant of proportionality as a second conditional inequality relating the second bound to a function of the unit profit function and the average volume, a computer readable program code which solves for the first bound and the second bound, a computer readable program code which estimates the constant of proportionality to be an average of the first bound and the second bound, a computer readable program code which solves for the first reference elasticity, and a computer readable program code which transfers the first reference elasticity and the constant of proportionality to a price optimization system of a demand model.

BRIEF DESCRIPTION OF THE DRAWINGS

FIG. 3 shows a sample data table used in the computation process of FIG. 2.

DETAILED DESCRIPTION OF THE DRAWINGS

Figure 1:
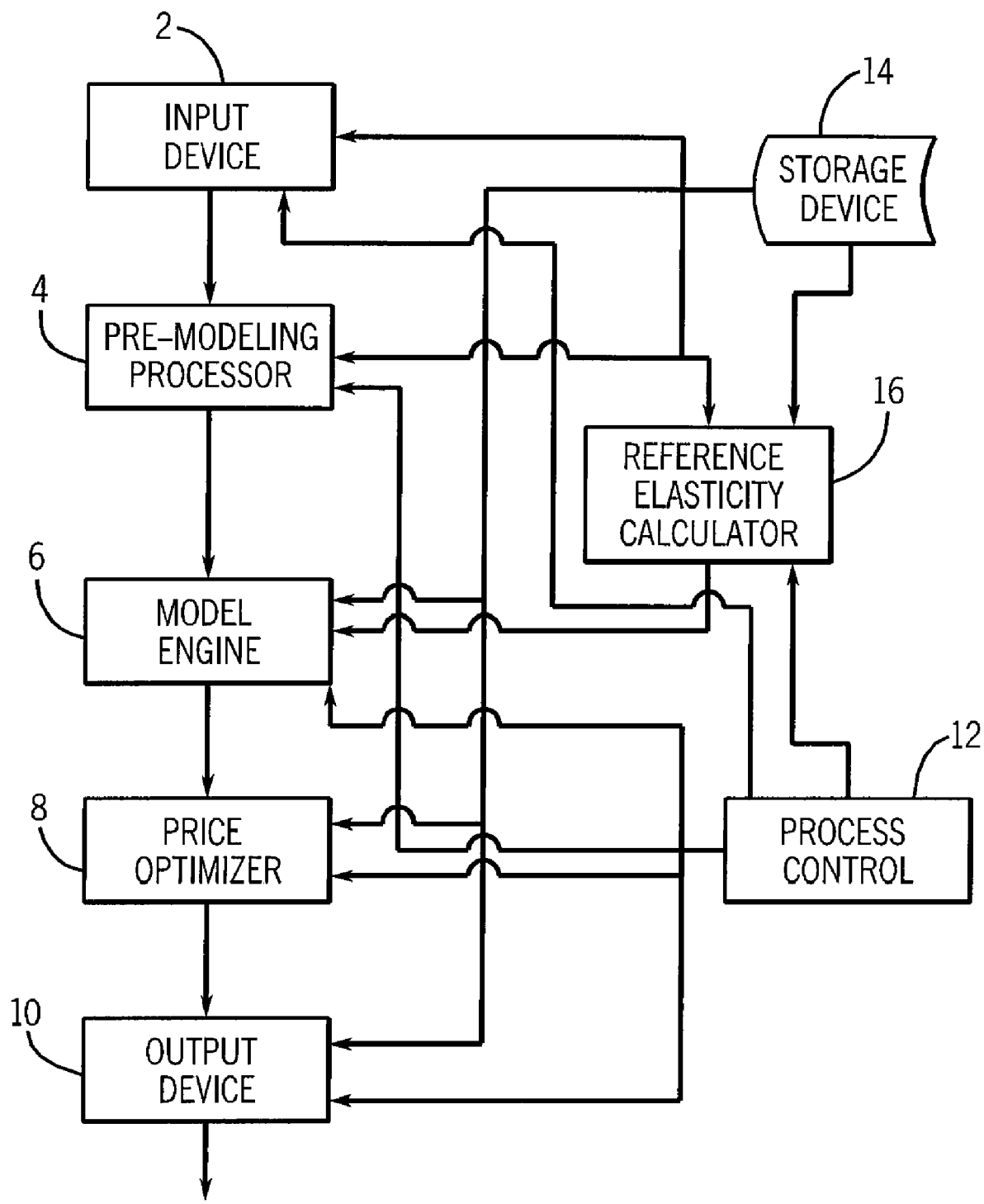
FIG. 1 is a block diagram illustrating an embodiment where a module for determining Bayesian priors through reverse engineering is embedded in an optimization system.

The present invention is described in one or more embodiments in the following description with reference to the Figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Economic and financial modeling and planning is an important business tool which allows companies to conduct business planning, forecast demand, model revenue, and optimize price and profit. Economic modeling is applicable to many businesses such as manufacturing, distribution, retail, medicine, chemicals, financial markets, investing, exchange rates, inflation rates, pricing of options, value of risk, research and development, and the like. In the face of mounting competition and high expectations from investors, most if not all businesses must look for every advantage they can muster in maximizing market share and profits. The ability to forecast demand, in view of pricing and promotional alternatives, and to consider other factors which materially affect overall revenue and profitability is vital to the success of the bottom line, and the fundamental need to not only survive but to prosper and grow.

Economic and financial models require accurate constraint parameters to yield relevant results. One method of determining robust and stable parameters is to use Bayesian inference. Generally speaking, Bayesian inference is a method whereby evidence is used to update the probability that a given hypothesis is true. Evidence is gathered that is either consistent or inconsistent with the hypothesis. As the evidence accumulates the degree of belief in the hypothesis changes. Thus, in modeling, Bayesian inference can be used to discriminate between conflicting hypotheses regarding the behavior of complex systems: hypotheses with a very high degree of belief can be accepted as true and those with a very low degree of belief should be rejected as false.

In its most basic form, Bayesian inference uses a numerical estimate of the probability that a hypothesis is true before evidence has been observed and then calculates a new numerical estimate of the probability that the hypothesis is still true after evidence has been observed. Thus, Bayesian modeling adjusts probabilities given new evidence according to the function:

$$\max(P(B \mid N)) = \max\left(\frac{P(N \mid B)P(B)}{P(N)}\right)$$

where
- B represents a hypothesis that was inferred before evidence N was available;
- $P(B)$ is the prior probability of B;
- $P(N|B)$ is the likelihood function of seeing the evidence N given that the hypothesis B is true;
- $P(N)$ is the probability witnessing N under all mutually exclusive hypotheses;
- $P(B|N)$ is the posterior probability of B given N; and
- $P(N|B)/P(N)$ represents the impact that N has on the belief in the hypothesis.

The present invention presents a new method of determining Bayesian priors for price elasticity by using a reverse engineering technique. Generally speaking, elasticity is the ratio of the proportional change in one variable with respect to proportional change in another variable. Price elasticity specifically is the sensitivity of the quantity demanded (or supplied) to changes in prices. The price elasticities determined by the present method can be used in demand models of financial products.

Throughout the discussion, P denotes the total number of products available to model and optimize, and p denotes an arbitrary product out of this set. If the context is clear, and the reference is to a single product, the interest rate or price for a product p is simply denoted as r. If the context involves several products, the rates are differentiated by using a superscript as in $r^{(p)}$. In the context of several products, a vector that consists of the collection of all rates for all products 1, 2, ..., P is simply denoted as r. The same context-based notation conventions are adopted for other quantities. For example, a function $f(\cdot)$ that depends on the interest rate of a single product p is denoted as $f(r)$ in the context of one product alone, or as $f^{(p)}(r^{(p)})$ otherwise. Again, in the context of several products, $f(r)$ would denote a function that depends on the rate for all products 1, 2, ..., P. Subscripts are used to denote certain properties, e.g., $r_{curr}^{(p)}$ denotes the current value for the interest rate of product p. In some cases the notation of a function may be abused to denote the dependency on a parameter, for example the dependency of $f^{(p)}(r^{(p)})$ on $\beta_{ref}^{(p)}$ is denoted by $f^{(p)}(r^{(p)}, \beta_{ref}^{(p)})$.

Even before performing any optimization process, a reasonable assumption can be made that large financial institutions set rates with the goal of achieving an institution-level objective. That objective could be, for example, to be as profitable as possible or to have some balance between profit and revenue. This objective can be approximately quantified by an expression involving the total profit for all transactions realized by a financial institution, denoted by Π, and total volume of capital moved by such transactions, denoted by V. More specifically, it is assumed that their global objective may be thought of as the maximization of some linear combination of profit and volume such as $\tilde{\Pi} = \Pi + \lambda V$, where $\tilde{\Pi}$ is the objective function for a given financial institution and λ controls the trade-off between profit and volume (also referred to as the strategy for the financial institution). The term profit is used to denote the institution's way of defining profit, which may, for example, be a custom nonlinear function of rate or a combination of several well-defined performance measurements such as Net Present Value (NPV), Risk Adjusted Return on Capital (RAROC), and so forth.

In financial modeling, reference elasticities can be determined by using the fact that current prices are set with the goal of maximizing an objective function. The idea is that a set of elasticity values can be determined that correspond to the current rates being optimal under the assumed objective function. The following discussion describes the science and processes required to compute the Bayesian priors for price elasticity parameters, as well as determining the strategy λ that most closely aligns with the current prices. Typically, these values would then be used as input parameters for a Bayesian modeling process.

A first embodiment of a method of determining an expression for reference elasticity $\beta_{ref}^{(p)}$ uses a simplistic demand model which ignores cross reference effects. An arbitrary functional form for the product level demand model $N_p^{(p)}(r, \beta^{(p)})$ and for the product level objective function $\tilde{\Pi}^{(p)}(r,\lambda)$ is assumed. Unless otherwise stated, these quantities are dependent not only on the rate of the product p, but also on the rate for any other product. A further assumption is made that the parameter λ is known and the same for all products. Accordingly, the global objective function is the sum of product level objective functions:

$$\tilde{\Pi}(r) = \sum_{p \in [1,2,...,P]} \tilde{\Pi}^{(p)}(r) = \sum_{p \in [1,2,...,P]} N^{(p)}(r, \beta) \tilde{\Pi}_0^{(p)}(r^{(p)}, \lambda), \quad (1)$$

where $\tilde{\Pi}_0^{(p)}(r^{(p)})$ is the effective profit functional for each unit of product p.

Since the demand function for each product depends on the vector of all rates, r, the global objective function (1) is generic enough to accommodate cross-product interactions such as cannibalization effects. It is also reasonable to expect that the unit-profit function for each product does not depend on the rates for other products, so $\tilde{\Pi}_0^{(p)}(r^{(p)})$ is also general enough to accommodate most practical effective-profit-per-unit functions. A more specific effective profit per unit defined by $\tilde{\Pi}_0^{(p)}(r^{(p)},\lambda) = \Pi_0^{(p)}(r^{(p)}) + \lambda V_{Avg}^{(p)}$ will subsequently be discussed.

The value of $\beta_{ref}^{(p)}$ is determined via the assumption that the objective function is optimal at the current rates. Since, in this case, the global problem cannot be decoupled, the first order optimality condition has to be multi-dimensional. So, to find $\beta_{ref}^{(p)}$, $\nabla \tilde{\Pi}(r) = 0$ at $r = r_{curr}$ must first be solved. Specifically:

$$\nabla \tilde{\Pi}(r) = \begin{bmatrix} \frac{d}{dr^{(1)}} \sum_{p \in [1,2,...,P]} \tilde{\Pi}^{(p)}(r) \\ \vdots \\ \frac{d}{dr^{(P)}} \sum_{p \in [1,2,...,P]} \tilde{\Pi}^{(p)}(r) \end{bmatrix}$$

$$= \begin{bmatrix} \sum_{p \in [1,2,...,P]} \frac{d}{dr^{(1)}} \left( N^{(p)}(r, \beta_{ref}^{(p)}) \tilde{\Pi}_0^{(p)}(r^{(p)}, \lambda) \right) \\ \vdots \\ \sum_{p \in [1,2,...,P]} \frac{d}{dr^{(P)}} \left( N^{(p)}(r, \beta_{ref}^{(p)}) \tilde{\Pi}_0^{(p)}(r^{(p)}, \lambda) \right) \end{bmatrix}$$

$$= 0$$

at $r = r_{curr}$. Simplification of this function yields:

$$\begin{bmatrix} \sum_{p \in [1,2,...,P]} \tilde{\Pi}_0^{(p)}(r^{(p)}, \lambda) \frac{d}{dr^{(1)}} \left( N^{(p)}(r, \beta_{ref}^{(p)}) \right) \\ \vdots \\ \sum_{p \in [1,2,...,P]} \tilde{\Pi}_0^{(p)}(r^{(p)}, \lambda) \frac{d}{dr^{(P)}} \left( N^{(p)}(r, \beta_{ref}^{(p)}) \right) \end{bmatrix} + \quad (2)$$

$$\begin{bmatrix} N^{(1)}(r, \beta_{ref}^{(1)}) \frac{d}{dr^{(1)}} \left( \tilde{\Pi}_0^{(1)}(r^{(1)}, \lambda) \right) \\ \vdots \\ N^{(P)}(r, \beta_{ref}^{(P)}) \frac{d}{dr^{(P)}} \left( \tilde{\Pi}_0^{(P)}(r^{(P)}, \lambda) \right) \end{bmatrix} = 0.$$

This provides a set of P equations in the P unknown $\beta_{ref}^{(p)}$'s. In general, the solution to equation (2) must be found by some numerical method. Then an a-posteriori test for the second order condition is performed to guarantee that the solution found is a maximum of the global objective function (1) The test is straightforward, and consists of forming the Hessian matrix for the objective function and testing it for negative definiteness, i.e., the result will be a maximum if $\nabla^2 \tilde{\Pi}(r) < 0$ at $r = r_{curr}$. This result for an expression of the reference elasticity for a simplistic demand model can be summarized as follows, referred to subsequently as Result 1:
The current rate $r_{curr}$ yields a maximum for the global objective function $\tilde{\Pi}(r)$ if and only if $\beta_{ref}$ and $\lambda_{ref}$ satisfy:

1. $$\begin{bmatrix} \sum_{p \in [1,2,\ldots,P]} \tilde{\Pi}_0^{(p)}(r^{(p)}, \lambda) \frac{d}{dr^{(1)}}(N^{(p)}(r, \beta_{ref}^{(p)})) \\ \vdots \\ \sum_{p \in [1,2,\ldots,P]} \tilde{\Pi}_0^{(p)}(r^{(p)}, \lambda) \frac{d}{dr^{(P)}}(N^{(p)}(r, \beta_{ref}^{(p)})) \end{bmatrix} + \begin{bmatrix} N^{(1)}(r, \beta_{ref}^{(1)}) \frac{d}{dr^{(1)}}(\tilde{\Pi}_0^{(1)}(r^{(1)}, \lambda)) \\ \vdots \\ N^{(P)}(r, \beta_{ref}^{(P)}) \frac{d}{dr^{(P)}}(\tilde{\Pi}_0^{(P)}(r^{(P)}, \lambda)) \end{bmatrix} = 0;$$

2. $\nabla^2 \tilde{\Pi}(r, \lambda, \beta_{ref}) < 0$ at $r = r_{curr}$.

Although highly useful, Result 1 applies to simplistic demand models and not to the common exponential form often applicable to financial systems. Exponential models are frequently used for demand models of two basic types of financial products: lending products and deposit products. Lending products are those for which interest will be paid by the final consumer to the financial institution for borrowing the institution's money for a certain period. Conversely, deposit products are those where the financial institution will pay interest to the consumers for keeping their money for a certain period of time. Some examples of lending products include mortgage loans and mortgage backed securities, home equity loans (HEL), home equity lines of credit (HELOC) and the related fixed rate loan options (FRLO), auto finance loans, personal loans, and similar products. Some examples of deposits products include deposit accounts, money market accounts, certificates of deposit, savings accounts, and similar products.

The expression for reference elasticity $\beta_{ref}$ as a function of known values can be explicitly derived. Consider an arbitrary product p for which a current rate $r_{curr}$, average volume $V_{Avg}$, and profit for each unit originated is a known function of the rate, denoted $\Pi_0(r)$. The number of originations for this product can be modeled as a function of the rate by:

$$N(r) = \exp(Q_0 + \beta r),$$

for some values of the parameters $Q_0$ and $\beta$. The value of $\beta$ must be negative for lending models, since higher rates will mean fewer originations. Similarly, if the bank offers a higher interest rate in a deposit, more customers will be prone to take it and, therefore, $\beta$ is a positive number for deposit models.

The theoretical total profit $\Pi(r)$ can be found by multiplying the unit-profit by the total number of units predicted by the model:

$$\Pi(r) = N(r)\Pi_0(r) = \exp(Q_0 + \beta r)\Pi_0(r). \quad (3)$$

Similarly, the theoretical total volume $V(r)$ is given by:

$$V(r) = N(r)V_{Avg} = \exp(Q_0 + \beta r)V_{Avg}. \quad (4)$$

An important assumption on the shape of the unit profit function in exponential demand models can also be made. The first derivative of the unit profit function for lending products must be strictly increasing, i.e., $$\frac{d\Pi_0}{dr}(r) > 0.$$

In other words, for lending products, the higher the rate, the higher the profit per unit. This is in fact a very reasonable and broad assumption that is respected by many, if not all, practical definitions of unit profit. The converse assumption is equally as valid for deposit models. Assuming the signs of the unit profit function $\Pi_0$ and the reference elasticity $\beta_{ref}$ must also agree with intuition, both assumptions can be summarized by:

1. for lending models: $\frac{d\Pi_0}{dr}(r) > 0$ and $\beta_{ref} < 0$;

2. for deposit models: $\frac{d\Pi_0}{dr}(r) < 0$ and $\beta_{ref} > 0$.

The parameterization of profit and volume of originations as functions of rate provides the ability to optimize the impact of rate changes to these quantities. For that purpose, the global objective function of the maximization problem is defined as a linear combination between profit and volume summed over all products:

$$\tilde{\Pi}(r) = \sum_{p \in [1,2,\ldots,P]} \tilde{\Pi}^{(p)}(r^{(p)}) = \sum_{p \in [1,2,\ldots,P]} \Pi^{(p)}(r^{(p)}) + \lambda V^{(p)}(r^{(p)}), \quad (5)$$

where the strategy $\lambda$ is a positive number and r stands for the vector of rates for all products. The right-hand-side of the expression is at the product level with $r^{(p)}$ being the rate for each product p.

The parameter $\lambda$ can be seen as a measure of "mix" between a pure profit $\lambda=0$ and a pure volume $\lambda \to \infty$ objective functions. The value of $\lambda$ is the same across all products. Hence, the optimal solution of the problem of maximizing $\tilde{\Pi}$ will produce rates that are "aligned" in strategy.

Since the product level expression for $\tilde{\Pi}^{(p)}$ depends only on that product's rate, it is clear that the maximum of function (5) can be found by the sum of product-wise maximums:

$$\max_r \tilde{\Pi}(r) = \sum_{p \in [1,2,\ldots,P]} \max_{r^{(p)}} \tilde{\Pi}^{(p)}(r^{(p)}). \quad (6)$$

Thus, the maximization of function (5) can be broken down into P one-dimensional (product level) maximization problems as in function (6). In the following solution of $$\max_{r^{(p)}} \tilde{\Pi}^{(p)}(r^{(p)})$$

the superscript (p) is dropped and the product level problem is written as max $\tilde{\Pi}(r)$, where r is a one-dimensional product rate.

The value of the global objective function is at a maximum only if its derivative with respect to the rate is null, that is, for $r^*$:

$$\frac{d\tilde{\Pi}}{dr}(r^*) = \frac{d\Pi}{dr}(r^*) + \lambda \frac{dV}{dr}(r^*) = 0. \tag{7}$$

In addition, to guarantee that r* yields a maximum, a second order condition also needs to be satisfied and is subsequently discussed.

The reference elasticity is defined by the value of $\beta$ that makes the condition of function (7) hold at the current rate, $r^* = r_{curr}$. More specifically, $\beta_{ref}$ is the solution to the equation:

$$\frac{d\Pi}{dr}(r_{curr}, \beta_{ref}) + \lambda \frac{dV}{dr}(r_{curr}, \beta_{ref}) = 0,$$

which dependency on $\beta_{ref}$ can be explicitly seen by substituting the values from equations (3) and (4) for the total predicted numbers of units and total theoretical volume:

$$\frac{d(\exp(Q_0 + \beta_{ref}r)\Pi_0(r))}{dr}(r_{curr}) + \lambda \frac{d(\exp(Q_0 + \beta_{ref}r)V_{Avg})}{dr}(r_{curr}) = 0.$$

Solving for $\beta_{ref}$, this equation yields the expression for reference elasticity:

$$\beta_{ref} = \frac{-\frac{d\Pi_0}{dr}(r_{curr})}{\Pi_0(r_{curr}) + \lambda V_{ave}}. \tag{8}$$

Note that, as mentioned before, it is assumed that for deposit products:

$$\beta_{ref} > 0, \text{ and } \frac{d\Pi_0}{dr}(r) < 0,$$

and for lending products:

$$\beta_{ref} < 0, \text{ and } \frac{d\Pi_0}{dr}(r) > 0.$$

This implies that:

$$\Pi_0(r_{curr}) + \lambda V_{Avg} > 0.$$

If $r_{curr}$ yields a maximum value, the second derivative of the function (5) should be negative at $r_{curr}$:

$$\frac{d^2\tilde{\Pi}}{dr^2}(r_{curr}) = \frac{d^2\Pi}{dr^2}(r_{curr}) + \lambda \frac{d^2V}{dr^2}(r_{curr}) < 0.$$

Substituting the expressions for $\Pi(r_{curr})$, $V(r_{curr})$, and $\beta_{ref}$, this produces:

$$\frac{d^2\Pi_0}{dr^2}(r_{curr}) - \frac{\left(\frac{d\Pi_0}{dr}(r_{curr})\right)^2}{\Pi_0(r_{curr}) + \lambda V_{Avg}} < 0. \tag{9}$$

Thus, the above analysis for exponential demand models can be summarized as follows, referenced as Result 2:

The current rate $r_{curr}$ yields a maximum for the function $\tilde{\Pi}(r)$ if and only if $\beta_{ref}$ and $\lambda$ satisfy:

1. $\beta_{ref} = \frac{-\frac{d\Pi_0}{dr}(r_{curr})}{\Pi_0(r_{curr}) + \lambda V_{Avg}};$ 2. $\frac{d^2\Pi_0}{dr^2}(r_{curr}) - \frac{\left(\frac{d\Pi_0}{dr}(r_{curr})\right)^2}{\Pi_0(r_{curr}) + \lambda V_{Avg}} < 0.$ Moreover, if the conditions of the basic assumptions regarding lending products and deposit products hold, then:

$$\Pi_0(r_{curr}) + \lambda V_{Avg} > 0.$$

If all products satisfy the conditions in Result 2, then the value for the enterprise level objective function will be maximum at the current rates $r_{curr}^{(1)}, r_{curr}^{(2)}, \ldots, r_{curr}^{(P)}$. In such case, the reference elasticity values can be found by equation 1 of Result 2. Note that $\lambda$ was assumed fixed, so equation 2 of Result 2 is a mere test. Subsequently, this expression will be used to determine a value of $\lambda$ that is acceptable.

In implementing a price optimization system, there are often rules that restrict the maximum allowable change in price. Typically, these rules are enforced through the optimization process, not the modeling process. In other words, during the modeling process it may be possible to obtain models that, upon optimization, would yield an unconstrained optimal rate change that is higher than the maximum acceptable value. To avoid this situation, bounds for the reference elasticity parameter can be suggested such that an optimization of the resulting model would always result in an optimal rate between the acceptable bounds around the current rate.

Determining the suggested bounds is very similar to determining the reference elasticity. To find the upper bound it is first assumed that the minimum rate is optimal. Then the reference elasticity value is reversed engineered. The minimum rate can be found by subtracting the maximum allowable rate change for a product from the current rate. Similarly, to find the lower bound it is first assumed that the maximum rate is optimal and then the sensitivity value is reversed engineered. Thus, the formulas for reference elasticity bounds are:

$$\beta_1 = \frac{\frac{d\Pi_0}{dr}(r_{curr} + \Delta r)}{\Pi_0(r_{curr} + \Delta r) + \lambda V_{Avg}}$$

and $$\beta_2 = \frac{\frac{d\Pi_0}{dr}(r_{curr} - \Delta r)}{\Pi_0(r_{curr} - \Delta r) + \lambda V_{Avg}},$$

where $\Delta r > 0$ is the maximum rate movement allowed (up or down).

Depending on the behavior of the profit function, the relationship between $\beta_1$ and $\beta_2$ is either $\beta_1 > \beta_2$ or $\beta_1 < \beta_2$. This ordering determines the upper and lower bounds for $\beta_{ref}$, generally expressed as: $\min(\beta_1, \beta_2) < \beta_{ref} < \max(\beta_1, \beta_2)$.

If computing the derivatives and the profit function at the perturbed rates is too costly and the rate changes are small, the profit function can be replaced by its second order approximation and the first derivative can be replaced by its first order approximation:

$$\beta_1 = \frac{\frac{d\Pi_0}{dr}(r_{curr}) + \Delta r \frac{d^2\Pi_0}{dr^2}(r_{curr})}{\Pi_0(r_{curr}) + \Delta r \frac{d\Pi_0}{dr}(r_{curr}) + \frac{(\Delta r)^2}{2} \frac{d^2\Pi_0}{dr^2}(r_{curr}) + \lambda V_{Avg}} \text{ and}$$

$$\beta_2 = \frac{\frac{d\Pi_0}{dr}(r_{curr}) - \Delta r \frac{d^2\Pi_0}{dr^2}(r_{curr})}{\Pi_0(r_{curr}) - \Delta r \frac{d\Pi_0}{dr}(r_{curr}) + \frac{(\Delta r)^2}{2} \frac{d^2\Pi_0}{dr^2}(r_{curr}) + \lambda V_{Avg}}.$$

The strategy $\lambda$ of a financial model is typically not known a priori. Thus, Result 2 is used to create an estimate for the reference parameter $\lambda$, referred to as the reference strategy and denoted as $\lambda_{ref}$.

First, equation 2 of Result 2 can be seen as the following two conditions on $\lambda_{ref}$:

$$\lambda_{ref} > \frac{-\Pi_0(r_{curr})}{V_{Avg}} \qquad (10)$$

$$\lambda_{ref}\left(\frac{d^2\Pi_0}{dr^2}(r_{curr})\right) < \frac{1}{V_{Avg}}\left[\left(\frac{d\Pi_0}{dr}(r_{curr})\right)^2 - \Pi_0(r_{curr})\frac{d^2\Pi_0}{dr^2}(r_{curr})\right].$$

The sign of $$\frac{d^2\Pi_0}{dr^2}(r_{curr})$$

is undetermined and hence the second inequality of condition (10) can be either an upper or a lower bound on $\lambda$. The local convexity of $\Pi_0$ $$\left(\frac{d^2\Pi_0}{dr^2}(r_{curr}) > 0\right)$$

cannot be guaranteed without further assumptions. Although many unit profit functions are convex, it may be possible to find a unit profit function which is not convex at the current rate, for example due to some strong effect from a risk metric component of that function.

The main conclusion from the previous analysis is that given a $\lambda_{ref}$ that satisfies equation 2 of Result 2, the value of the reference elasticity is determined by the equation 1 of Result 2. Thus, if the value of $\lambda_{ref}$ is not known, $\lambda_{ref}$ can be found by simply imposing equation 2 of Result 2 for all products $p \in [1, 2, \ldots, P]$. This can be done by imposing the bounds in inequalities (10) for all products, providing Result 3:

The set of all values of $\lambda_{ref}$ that produce a maximum of the objective function at $r=r_{curr}$ is defined by the bounds:

$$\lambda_{ref} > \max_{all\ p}\left\{\frac{-\Pi_0^{(p)}(r_{curr}^{(p)})}{V_{Avg}^{(p)}}\right\}, \text{ and}$$

$$\lambda_{ref}\left(\frac{d^2\Pi_0^{(p)}}{dr^2}(r_{curr}^{(p)})\right) <$$

$$\frac{1}{V_{Avg}^{(p)}}\left[\left(\frac{d\Pi_0^{(p)}}{dr}(r_{curr}^{(p)})\right)^2 - \Pi_0^{(p)}(r_{curr}^{(p)})\frac{d^2\Pi_0^{(p)}}{dr^2}(r_{curr}^{(p)})\right] \text{ for all } p.$$

Result 3 is independent of $\beta_{ref}^{(p)}$, and can be determined prior to solving equation 1 of Result 2. In general, this inequality does not give a single solution for $\lambda_{ref}$ and instead provides a bound on the values which $\lambda_{ref}$ can attain such that $\beta_{ref}^{(p)}$ yields meaningful results.

The bounds in Result 3 may be tightened for a more accurate estimate of $\lambda_{ref}$ by including additional conditions on the reference elasticity results, such as $\beta^{(LowFICO)} < \beta^{(HighFICO)}$ where an assumption is made that a person with a higher FICO (Fair Isaac Corporation) score is in general more price sensitive due to a higher abundance of choices in financial products. Result 3 defines a set of values of $\lambda_{ref}$ that yield acceptable $\beta_{ref}^{(p)}$, from the perspective of generating a maximum for $\tilde{\Pi}(r)$. In general, additional information can be used to help determine these values. For example, something may be known about the ordering of $\beta_{ref}^{(p)}$. One practical example of this pertaining to loan products is that customers with higher FICO scores (lower risk) should be more sensitive to the rate they are offered than customers with lower FICO scores. So, if product 1 is a high FICO product and product 2 is a similar product for lower FICO customers, that logic would be translated into the reference elasticity as the condition $\beta_{ref}^{(2)} < \beta_{ref}^{(1)}$. This rule can be expressed in terms of $\lambda_{ref}$ by substituting the expression for $\beta_{ref}^{(p)}$ as a function of $\lambda_{ref}$ into the inequality $\beta_{ref}^{(2)} < \beta_{ref}^{(1)}$. This yields Result 4:

Any inequality $\beta_{ref}^{(k)} < \beta_{ref}^{(n)}$ involving the reference elasticity for two distinct products can be translated into an inequality on $\lambda_{ref}$ alone, given by:

$$\left(V_{Avg}^{(k)}\frac{d\Pi_0^{(n)}}{dr}(r_{curr}^{(n)}) - V_{Avg}^{(n)}\frac{d\Pi_0^{(k)}}{dr}(r_{curr}^{(k)})\right)\lambda_{ref} >$$

$$\Pi_0^{(n)}(r_{curr}^{(n)})\frac{d\Pi_0^{(k)}}{dr}(r_{curr}^{(k)}) - \Pi_0^{(k)}(r_{curr}^{(k)})\frac{d\Pi_0^{(n)}}{dr}(r_{curr}^{(n)}).$$

This result has a further implication: any set of conditions of the form $\beta_{ref}^{(k)} < \beta_{ref}^{(n)}$ can be incorporated into the problem of finding $\lambda_{ref}$ by restricting the search space accordingly. This conclusion is summarized as Result 5:

In the presence of additional inequalities of the type $\beta_{ref}^{(k)} < \beta_{ref}^{(n)}$ for some pairs of products $(k,n) \in \text{ProdPairs}$, $\lambda_{ref}$ can be found by simultaneously solving the inequalities:

1. $\left(V_{Avg}^{(k)}\frac{d\Pi_0^{(n)}}{dr}(r_{curr}^{(n)}) - V_{Avg}^{(n)}\frac{d\Pi_0^{(k)}}{dr}(r_{curr}^{(k)})\right)\lambda_{ref} >$ $$\Pi_0^{(n)}(r_{curr}^{(n)})\frac{d\Pi_0^{(k)}}{dr}(r_{curr}^{(k)}) - \Pi_0^{(k)}(r_{curr}^{(k)})\frac{d\Pi_0^{(n)}}{dr}(r_{curr}^{(n)})$$

for all $(k, n) \in \text{ProdPairs}$;

2. $\lambda_{ref} > \max_{all\ p}\left\{\frac{-\Pi_0^{(p)}(r_{curr}^{(p)})}{V_{Avg}^{(p)}}\right\}$, and $$\lambda_{ref}\left(\frac{d^2\Pi_0^{(p)}}{dr^2}(r_{curr}^{(p)})\right) <$$

$$\frac{1}{V_{Avg}^{(p)}}\left[\left(\frac{d\Pi_0^{(p)}}{dr}(r_{curr}^{(p)})\right)^2 - \Pi_0^{(p)}(r_{curr}^{(p)})\frac{d^2\Pi_0^{(p)}}{dr^2}(r_{curr}^{(p)})\right] \text{ for all } p.$$

In using Result 2 to determine the reference strategy $\lambda_{ref}$, the assumptions behind Result 2 are incorporated into Results 3, 4, and 5. Result 2 is based on the assumption that the current rates will generate an optimal point for some values of $\beta_{ref}$. Nevertheless, it is possible that the current rates are not an optimal set for any choice of $\lambda_{ref}$ (which uniquely determines all $\beta_{ref}$'s). In such cases, the solution set to the inequality bounds in Result 3 is the empty set. In such a situation the solution set of $\beta_{ref}$'s and $\lambda_{ref}$ can be determined via a relaxation of the optimality assumption.

Result 2 provides the optimality assumption that the global objective function (1) is optimal at the current set of rates. In general, this can be a very strict requirement. A more relaxed assumption is that the objective function is optimal at some point in a neighborhood of the current rate. This optimal point is denoted as $r_{opt}$. Following the method used in obtaining Results 2 and 3, the optimality at $r_{opt}$ can be also found, referenced as Result 6:

If r* produces a maximum for the objective function, then

1. $\lambda_{ref} > \max\limits_{all\ p} \left\{ \dfrac{-\Pi_0^{(p)}(r^*)}{V_{Avg}^{(p)}} \right\}$, and $\lambda_{ref}\left(\dfrac{d^2\Pi_0^{(p)}}{dr^2}(r^*)\right) <$ $\dfrac{1}{V_{Avg}^{(p)}}\left[\left(\dfrac{d\Pi_0^{(p)}}{dr}(r^*)\right)^2 - \Pi_0^{(p)}(r^*)\dfrac{d^2\Pi_0^{(p)}}{dr^2}(r^*)\right]$ for all $p$.

2. $\beta_{ref} = \dfrac{\dfrac{d\Pi_0}{dr}(r^*)}{\Pi_0(r^*) + \lambda_{ref}V_{Avg}}$.

Result 6 is not practical since searching the space within a neighborhood of the current rate is a combinatorial problem. However, for a reasonably small neighborhood of the current point, it is possible to approximate the unit profit function via its first order approximation. In this same neighborhood, it can also be assumed that the derivatives do not change much and, thus, replace $\Pi_0^{(p)}(r^*) = \Pi_0^{(p)}(r_{curr}^{(p)}) + \Delta r^{(p)}\dfrac{d\Pi_0^{(p)}}{dr}(r_{curr}^{(p)})$.

Under such assumptions, the Result 6 is simplified, providing Result 7:

If $r^*=r_{curr}+\Delta r$ produces a maximum for the objective price function, then $\lambda_{ref} > \max\limits_{all\ p}\left\{\dfrac{-\Pi_0^{(p)} - \Delta r^{(p)}\dfrac{d\Pi_0^{(p)}}{dr}}{V_{Avg}^{(p)}}\right\}$, and $\lambda_{ref}\left(\dfrac{d^2\Pi_0^{(p)}}{dr^2}\right) <$ $\dfrac{1}{V_{Avg}^{(p)}}\left[\left(\dfrac{d\Pi_0^{(p)}}{dr}\right)^2 - \left(\Pi_0^{(p)} + \Delta r^{(p)}\dfrac{d\Pi_0^{(p)}}{dr}\right)\dfrac{d^2\Pi_0^{(p)}}{dr^2}\right]$ for all $p$.

where all the functions are evaluated at $r_{curr}$. The resulting reference elasticities can be computed by:

$\beta_{ref}^{(p)} = \dfrac{\dfrac{d\Pi_0^{(p)}}{dr}}{\Pi_0^{(p)} + \Delta r^{(p)}\dfrac{d\Pi_0^{(p)}}{dr} + \lambda_{ref}V_{Avg}}$.

Result 7 depends on finding a perturbation vector $\Delta r$ such that the perturbed rate $r^*=r_{curr}+\Delta r$ is optimal. In the inequalities above, all terms in $\Delta r$ and $\lambda_{ref}$ are linear and, therefore, essentially the problem of finding $\lambda_{ref}$ and the set of $\Delta r^{(p)}$ for all p that satisfy the inequalities is also linear. One possible technique then is to cast it as a Linear Programming (LP) problem, referenced as Result 8:

A solution $\lambda_{ref}$ and $\Delta r^{(p)}$ for all p can be found by solving the following LP problem:

min $\gamma$ subject to (for all $p \in [1, 2, \cdots, P]$):

$\Delta r^{(p)} < \gamma$ $\Delta r^{(p)} > -\gamma$ $\lambda_{ref}\left(\dfrac{d^2\Pi_0^{(p)}}{dr^2}\right) < \dfrac{1}{V_{Avg}^{(p)}}\left[\left(\dfrac{d\Pi_0^{(p)}}{dr}\right)^2 - \left(\Pi_0^{(p)} + \Delta r^{(p)}\dfrac{d\Pi_0^{(p)}}{dr}\right)\dfrac{d^2\Pi_0^{(p)}}{dr^2}\right]$ $\lambda_{ref} > \max\left\{\dfrac{-\Pi_0^{(p)} - \Delta r^{(p)}\dfrac{d\Pi_0^{(p)}}{dr}}{V_{Avg}^{(p)}}\right\}$ where all the functions are evaluated at $r_{curr}$. The resulting reference sensitivities can be computed by:

$\beta_{ref}^{(p)} = \dfrac{\dfrac{d\Pi_0^{(p)}}{dr}}{\Pi_0^{(p)} + \Delta r^{(p)}\dfrac{d\Pi_0^{(p)}}{dr} + \lambda V_{Avg}}$.

Note that the dummy variable $\gamma$ in the LP above is used to minimize the maximum absolute value of $\Delta r^{(p)}$ among all p. In essence, the LP is searching for a solution that is closest to the current set of rates in the "infinity norm" sense (defined by $\|x\|_\infty := \max\limits_i(|x_i|))$.

Other metrics can be easily implemented, including "1-norm" and a quadratic norm (via quadratic programming techniques).

In the absence of any pricing rules and cannibalization effects, it is possible to determine the direction of the optimal rate movement for any given product just by comparing the reference elasticity to the actual elasticity. To do so, it is assumed that the current strategy is the same as the strategy for the next optimization cycle or, in other words, that $\lambda$ does not change with time. As previously shown as condition (7), the global objective function is at the optimal rate r* when:

$\dfrac{d\tilde{\Pi}}{dr}(r^*) = \dfrac{d\Pi}{dr}(r^*) + \lambda\dfrac{dV}{dr}(r^*) = 0$.

As before, substituting equations (3) and (4) for the total predicted number of units and total theoretical volume in the expression above yields:

$$\frac{d(\exp(Q_0 - \beta r)\Pi_0(r))}{dr} + \lambda \frac{d(\exp(Q_0 - \beta r)V_{avg})}{dr} = 0,$$

which can be expanded to obtain:

$$\exp(Q_0 - \beta r)\frac{d(\Pi_0(r))}{dr} - \beta \exp(Q_0 - \beta r)\Pi_0(r) - \beta \lambda \exp(Q_0 - \beta r)V_{avg} = 0.$$

This can then be simplified by canceling out the exponential term:

$$\frac{d(\Pi_0(r))}{dr} - \beta \Pi_0(r) - \beta \lambda V_{avg} = 0.$$

Assuming that $$\frac{d\Pi_0}{dr}(r^*) = \frac{d\Pi_0}{dr}(r_{curr}),$$

and that the unit-profit function is approximately linear in a small interval that contains the optimal rate and the current rate, it is possible to replace the equation above by its first order Taylor expansion $$\Pi_0(r^*) = \Pi_0(r_{curr}) + \frac{d\Pi_0}{dr}(r_{curr})(r^* - r_{curr}),$$

obtaining:

$$\frac{d\Pi_0}{dr}(r_{curr}) - \beta\left(\Pi_0(r_{curr}) + \frac{d\Pi_0}{dr}(r_{curr})(r^* - r_{curr})\right) - \beta\lambda V_{avg} = 0.$$

After some manipulations and using the reference elasticity equation (8), the relationship between the direction of the optimal rate movement and elasticity is:

$$r^* - r_{curr} = \frac{\beta_{ref} - \beta}{\beta\beta_{ref}}.$$

This equation is satisfied by the following relationships of elasticity and rate:
If $\beta_{ref} > \beta$, then $r^* > r_{curr}$;
If $\beta_{ref} = \beta$, then $r^* = r_{curr}$;
If $\beta_{ref} < \beta$, then $r^* < r_{curr}$;
where $r^*$ is the optimum rate. Therefore, it is possible to determine the optimal rate of movement for any given product through comparison of the reference elasticity and the actual elasticity.

It should be noted that the relationships above are guaranteed only when the unit-profit function is approximately linear on the rate interval defined by the optimal rate and the current rate. In the particular case of a linear unit-profit function (e.g., $\Pi_0(r) = r - COF$), where COF stands for the cost of funds or, generally speaking, cost, the results are valid globally.

The basic assumption used in determining reference elasticity is that, on the average, the current rates should not be too far from the optimal rates. Thus, a good initial guess for elasticity of a product is given by Result 2. Since this is really an assumption on the dynamics of originations with respect to rate, it is reasonable to assume that for any given product, such dynamics should be an invariant. So conceptually, a competitor should obtain the same dynamics (i.e., $\beta_{ref}$) if they compute equation 1 of Result 2 using their own rates instead:

$$\beta_{refComp} = \frac{\frac{d\Pi_0}{dr}(r_{comp})}{\Pi_0(r_{comp}) + \lambda_{comp} V_{ave}}.$$

The expression for $\beta_{ref}$ in equation (8) can be used to then estimate what a competitor's strategy is for each product. More specifically, once $\beta_{ref}$ is calculated via Result 2, setting $\beta_{refComp} = \beta_{ref}$ in (8) and solving for $\lambda_{Comp}$ provides an equation for determining a competitor's strategy:

$$\lambda_{comp} = \frac{1}{V_{avg}}\left(\frac{\frac{d\Pi_0}{dr}(r_{comp})}{\beta_{refComp}} - \Pi_0(r_{comp})\right).$$

The method described herein of determining reference elasticity and reference strategy can be implemented in many ways, including as a process, a system or a computer program. In FIG. 1, the method is used as a component of a price optimization system including: an input device 2, a pre-modeling processor 4, a modeling engine 6, a price optimizer 8, an output device 10, a process control device 12, a storage device 14, and a reference elasticity calculator 16.

Input device 2, such as a keyboard or automated data interface, loads current interest rate and historical sales data into the system. Pre-modeling processor 4 organizes the raw data to make it functional for modeling engine 6 to process. Modeling engine 6 tunes demand models to historical data, computes the model parameters and predicts various key performance indicators such as volume, profit, utilization ratio, etc., at different interest rates for each product.

Price optimizer 8 uses the parameters from modeling engine 6, and combines them with profit calculation and business constraints to generate a set of optimal rates that maximize total profit or other strategic goals under given constraints on all products in a pricing portfolio. Price optimizer 8 is essentially an algorithm that solves a complex mathematical problem of determining the optimal price for a loan product from a large number of pricing scenarios that involve multiple products, while maintaining all constraints on prices.

Output device 10 exports results such as recommended interest rates and forecasted volume to external storage or display device, from which a user can access. Process control device 12 gives a user the ability to select components, change the default system setting, and monitor the whole process. Finally, storage device 14 provides the internal database to store all types of data, including product hierarchy, parameter values, and recommended price.

Reference elasticity calculator 16 takes assumptions of profit determination and current prices from a user, and computes values of reference elasticity and reference strategy for each product. The computed values are saved to storage device 14 and are selected to be used by modeling engine 6 to produce final estimates of price elasticity of demand. Finally, price optimizer 8 relies on these estimates to determine optimal prices or a set of prices that achieve particular enterprise level goals chosen by a user.

Figure 2:
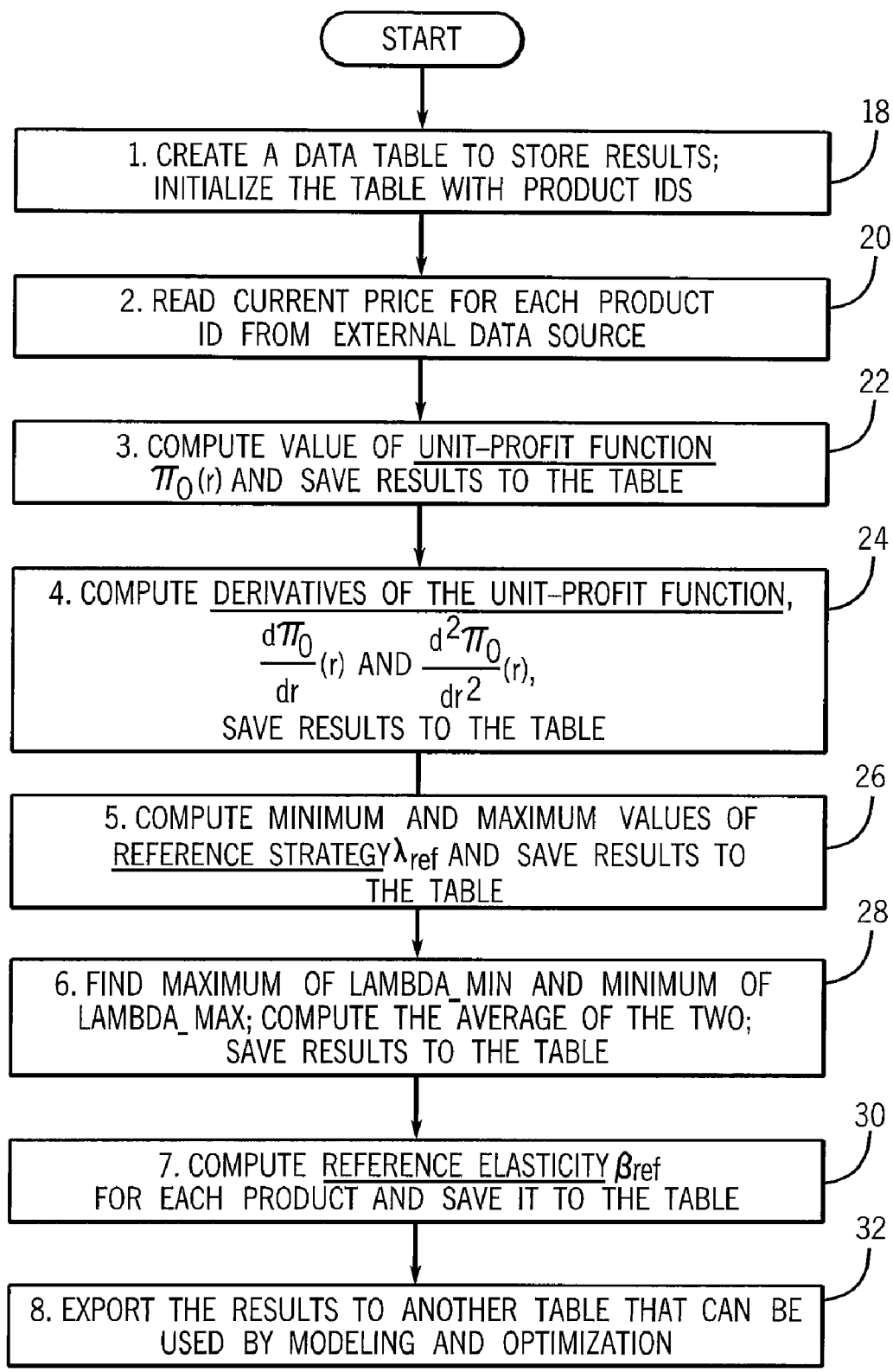
FIG. 2 presents a flow chart of the computation process used by the module for determining Bayesian priors of FIG. 1.

FIG. 2 presents a flow chart of the computation process used by reference elasticity calculator 16 of FIG. 1. A person of ordinary skill in the art will appreciate that the order of the steps of this routine may be altered within the scope of the invention and that other appropriate computation techniques and formats of input can be used as well.

In step 18 a table is created for the storage of data. Prior to initiating the computation routine, the data table is populated with a list of product ID for which the reference elasticity will be computed. For a given product ID, the corresponding reference elasticity which is computed is saved in one column of the table.

Next, in step 20, the current prices or user-specified prices are entered into the data table for each product ID. Then, in step 22, a processor reads the pre-defined profit function, computes and returns the value of unit-profit function $\Pi_0(r)$ evaluated at the aforementioned prices. The results are saved in the data table.

The processor in step 24 computes and returns the values of the derivative of the unit-profit function, $$\frac{d\Pi_0}{dr}(r),$$

evaluated at the aforementioned prices. The value can be obtained using a first-order finite difference method or any other numerical approximation method. The processor also computes the values of the second derivative of the unit-profit function, $$\frac{d^2\Pi_0}{dr^2}(r)$$

evaluated at the same prices. Again, the value can be obtained using a second-order finite difference method or any other numerical approximation method. The results are also saved in the data table.

In step 26, the processor computes and returns the minimum and maximum values of reference strategy $\lambda_{ref}$ for each product using inequality (10). The results are saved in the data table.

Next, in step 28, the processor sorts and finds the maximum of $\lambda$ and the minimum of $\lambda$ across all saved values of the reference strategy $\lambda_{ref}$ in the data table. Then, $\lambda_{ref}$ is computed as the average of these two values.

In step 30, the processor computes reference elasticity $\beta_{ref}$ by using the equation 1 of Result 2 saved values of unit-profit function $\Pi_0(r)$, the derivative of the unit-profit function $$\frac{d\Pi_0}{dr}(r),$$

and the value of reference strategy $\lambda_{ref}$ as the required inputs of the formula. The results are also saved in the data table.

Finally, in step 32, the reference elasticity $\beta_{ref}$ and reference strategy $\lambda_{ref}$ are exported to another data table that can be accessed by modeling engine 6, price optimizer 8, and output device 10, all shown in FIG. 1.

FIG. 3 shows a sample data table 34 representing a portion of computation results that may be used by modeling engine 6 and price optimizer 8 or be presented directly to a user for review.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method comprising:
providing, by a computer, a current rate of a first product;
providing, by the computer, a first reference elasticity for the first product as a function of a unit profit function of the first product with respect to the current rate and an average volume of the first product, wherein the function further includes a constant of proportionality between the unit profit function and the average volume;
expressing, by the computer, a first bound of the constant of proportionality as a first conditional inequality relating the first bound to a function of the unit profit function and the average volume;
expressing, by the computer, a second bound of the constant of proportionality as a second conditional inequality relating the second bound to a function of the unit profit function and the average volume;
solving, by the computer, for the first bound and the second bound;
estimating, by the computer, the constant of proportionality to be an average of the first bound and the second bound; and
solving, by the computer, for the first reference elasticity.

2. The computer implemented method of claim 1, wherein the first reference elasticity is further expressed as $$\beta_{ref} = \frac{-\frac{d\Pi_0}{dr}(r_{curr})}{\Pi_0(r_{curr}) + \lambda V_{ave}}.$$

3. The computer implemented method of claim 1, wherein the first bound and the second bound are further expressed as $$\lambda_{ref} > \frac{-\Pi_0(r_{curr})}{V_{Avg}}$$

$$\lambda_{ref}\left(\frac{d^2\Pi_0}{dr^2}(r_{curr})\right) < \frac{1}{V_{Avg}}\left[\left(\frac{d\Pi_0}{dr}(r_{curr})\right)^2 - \Pi_0(r_{curr})\frac{d^2\Pi_0}{dr^2}(r_{curr})\right].$$

4. The computer implemented method of claim 3, wherein the first bound and the second bound are tightened by including additional conditions on the reference elasticity.

5. The computer implemented method of claim 4, wherein the constant of proportionality may be further expressed as $$\left(V_{Avg}^{(k)}\frac{d\Pi_0^{(n)}}{dr}(r_{curr}^{(n)}) - V_{Avg}^{(n)}\frac{d\Pi_0^{(k)}}{dr}(r_{curr}^{(k)})\right)\lambda_{ref} >$$

$$\Pi_0^{(n)}(r_{curr}^{(n)})\frac{d\Pi_0^{(k)}}{dr}(r_{curr}^{(k)}) - \Pi_0^{(k)}(r_{curr}^{(k)})\frac{d\Pi_0^{(n)}}{dr}(r_{curr}^{(n)})$$

when the first reference of elasticity for the first product and a second reference of elasticity for a second product may be expressed as $$\beta_{ref}^{(k)} < \beta_{ref}^{(n)}.$$

6. The computer implemented method of claim 1, further including providing a relationship between the first reference elasticity and a direction of an optimal rate movement.

7. The computer implemented method of claim 6, wherein the relationship between the first reference elasticity and the direction of the optimal rate movement is expressed as $$r^* - r_{curr} = \frac{\beta_{ref} - \beta}{\beta \beta_{ref}}.$$

8. The computer implemented method of claim 1, wherein a competing reference elasticity for a competing rate of a competing product is expressed by $$\beta_{refComp} = \frac{\frac{d\Pi_0}{dr}(r_{comp})}{\Pi_0(r_{comp}) + \lambda_{comp} V_{ave}}.$$

9. The computer implemented method of claim 8, wherein a competing constant of proportionality is expressed by $$\lambda_{comp} = \frac{1}{V_{avg}} \left( \frac{\frac{d\Pi_0}{dr}(r_{comp})}{\beta_{refComp}} - \Pi_0(r_{comp}) \right).$$

10. The computer implemented method of claim 1, further including transferring the first reference elasticity and the constant of proportionality to a price optimization system.

11. A method of providing a computer demand model having a reference value, comprising:
providing, by a system that includes a process control device, a current rate of a first product;
providing, by the system that includes the process control device, a first reference elasticity for the first product as a function of a unit profit function of the first product with respect to the current rate and an average volume of the first product, wherein the function further includes a constant of proportionality between the unit profit function and the average volume;
expressing, by the system that includes the process control device, a first bound of the constant of proportionality as a first conditional inequality relating the first bound to a function of the unit profit function and the average volume;
expressing, by the system that includes the process control device, a second bound of the constant of proportionality as a second conditional inequality relating the second bound to a function of the unit profit function and the average volume;
solving, by the system that includes the process control device, for the first bound and the second bound;
estimating, by the system that includes the process control device, the constant of proportionality to be an average of the first bound and the second bound; and
solving, by the system that includes the process control device, for the first reference elasticity.

12. The method of claim 11, wherein the first reference elasticity is further expressed as $$\beta_{ref} = \frac{-\frac{d\Pi_0}{dr}(r_{curr})}{\Pi_0(r_{curr}) + \lambda V_{ave}}.$$

13. The method of claim 11, wherein the first bound and the second bound are further expressed as $$\lambda_{ref} > \frac{-\Pi_0(r_{curr})}{V_{Avg}}$$

$$\lambda_{ref} \left( \frac{d^2\Pi_0}{dr^2}(r_{curr}) \right) < \frac{1}{V_{Avg}} \left[ \left( \frac{d\Pi_0}{dr}(r_{curr}) \right)^2 - \Pi_0(r_{curr}) \frac{d^2\Pi_0}{dr^2}(r_{curr}) \right].$$

14. The method of claim 13, wherein the first bound and the second bound are tightened by including additional conditions on the reference elasticity.

15. The method of claim 11, wherein the constant of proportionality may be further expressed as $$\left( V_{Avg}^{(k)} \frac{d\Pi_0^{(n)}}{dr}(r_{curr}^{(n)}) - V_{Avg}^{(n)} \frac{d\Pi_0^{(k)}}{dr}(r_{curr}^{(k)}) \right) \lambda_{ref} >$$

$$\Pi_0^{(n)}(r_{curr}^{(n)}) \frac{d\Pi_0^{(k)}}{dr}(r_{curr}^{(k)}) - \Pi_0^{(k)}(r_{curr}^{(k)}) \frac{d\Pi_0^{(n)}}{dr}(r_{curr}^{(n)})$$

when the first reference of elasticity for the first product and a second reference of elasticity for a second product may be expressed as $$\beta_{ref}^{(k)} < \beta_{ref}^{(n)}.$$

16. The method of claim 11, further including providing a relationship between the first reference elasticity and a direction of an optimal rate movement.

17. The method of claim 16, wherein the relationship between the first reference elasticity and the direction of the optimal rate movement is expressed as $$r^* - r_{curr} = \frac{\beta_{ref} - \beta}{\beta \beta_{ref}}.$$

18. The method of claim 11, wherein a competing reference elasticity for a competing rate of a competing product is expressed by $$\beta_{refComp} = \frac{\frac{d\Pi_0}{dr}(r_{comp})}{\Pi_0(r_{comp}) + \lambda_{comp} V_{ave}}.$$

19. The method of claim 18, wherein a competing constant of proportionality is expressed by $$\lambda_{comp} = \frac{1}{V_{avg}} \left( \frac{\frac{d\Pi_0}{dr}(r_{comp})}{\beta_{refComp}} - \Pi_0(r_{comp}) \right).$$

20. The method of claim 11, further including transferring the first reference elasticity and the constant of proportionality to a price optimization system.

21. A computer program product usable with a programmable computer processor having a computer readable program code embodied therein, comprising:
- a computer readable program code which provides a current rate of a first product;
- a computer readable program code which provides a first reference elasticity for the first product as a function of a unit profit function of the first product with respect to the current rate and an average volume of the first product, wherein the function further includes a constant of proportionality between the unit profit function and the average volume;
- a computer readable program code which expresses a first bound of the constant of proportionality as a first conditional inequality relating the first bound to a function of the unit profit function and the average volume;
- a computer readable program code which expresses a second bound of the constant of proportionality as a second conditional inequality relating the second bound to a function of the unit profit function and the average volume;
- a computer readable program code which solves for the first bound and the second bound;
- a computer readable program code which estimates the constant of proportionality to be an average of the first bound and the second bound;
- a computer readable program code which solves for the first reference elasticity; and
- a computer readable program code which transfers the first reference elasticity and the constant of proportionality to a price optimization system of a demand model.

22. The computer program product of claim 21, further including:
expressing the first reference elasticity as $$\beta_{ref} = \frac{-\frac{d\Pi_0}{dr}(r_{curr})}{\Pi_0(r_{curr}) + \lambda V_{ave}}; \text{ and}$$

expressing the first bound and the second bound as $$\lambda_{ref} > \frac{-\Pi_0(r_{curr})}{V_{Avg}}$$

$$\lambda_{ref}\left(\frac{d^2\Pi_0}{dr^2}(r_{curr})\right) < \frac{1}{V_{Avg}}\left[\left(\frac{d\Pi_0}{dr}(r_{curr})\right)^2 - \Pi_0(r_{curr})\frac{d^2\Pi_0}{dr^2}(r_{curr})\right].$$

23. The computer program product of claim 22, further including:
tightening the first bound and the second bound by including additional conditions on the reference elasticity; and
expressing the constant of proportionality as $$\left(V_{Avg}^{(k)}\frac{d\Pi_0^{(n)}}{dr}(r_{curr}^{(n)}) - V_{Avg}^{(n)}\frac{d\Pi_0^{(k)}}{dr}(r_{curr}^{(k)})\right)\lambda_{ref} >$$

$$\Pi_0^{(n)}(r_{curr}^{(n)})\frac{d\Pi_0^{(k)}}{dr}(r_{curr}^{(k)}) - \Pi_0^{(k)}(r_{curr}^{(k)})\frac{d\Pi_0^{(n)}}{dr}(r_{curr}^{(n)})$$

when the first reference of elasticity for the first product and a second reference of elasticity for a second product may be expressed as $$\beta_{ref}^{(k)} < \beta_{ref}^{(n)}.$$

24. The computer program product of claim 21, further including computer readable program code providing a relationship between the first reference elasticity and a direction of an optimal rate movement, wherein the relationship is expressed as $$r^* - r_{curr} = \frac{\beta_{ref} - \beta}{\beta\beta_{ref}}.$$

25. The computer program product of claim 21, further including:
a computer readable program code which provides a competing reference elasticity for a competing rate of a competing product expressed by $$\beta_{refComp} = \frac{\frac{d\Pi_0}{dr}(r_{comp})}{\Pi_0(r_{comp}) + \lambda_{comp}V_{ave}}; \text{ and}$$

a computer readable program code which provides a competing constant of proportionality expressed by $$\lambda_{comp} = \frac{1}{V_{avg}}\left(\frac{\frac{d\Pi_0}{dr}(r_{comp})}{\beta_{refComp}} - \Pi_0(r_{comp})\right).$$

26. A system comprising:
a computer to:
- provide a current rate of a first product;
- provide a first reference elasticity for the first product as a function of a unit profit function of the first product with respect to the current rate and an average volume of the first product, wherein the function further includes a constant of proportionality between the unit profit function and the average volume;
- express a first bound of the constant of proportionality as a first conditional inequality relating the first bound to a function of the unit profit function and the average volume;
- express a second bound of the constant of proportionality as a second conditional inequality relating the second bound to a function of the unit profit function and the average volume;
- solve for the first bound and the second bound;
- estimate the constant of proportionality to be an average of the first bound and the second bound; and
- solve for the first reference elasticity.

27. A system comprising:
a price optimization system that includes a process control device, the price optimization system to:
- provide a current rate of a first product;
- provide a first reference elasticity for the first product as a function of a unit profit function of the first product with respect to the current rate and an average volume of the first product, wherein the function further includes a constant of proportionality between the unit profit function and the average volume;
- express a first bound of the constant of proportionality as a first conditional inequality relating the first bound to a function of the unit profit function and the average volume;

express a second bound of the constant of proportionality as a second conditional inequality relating the second bound to a function of the unit profit function and the average volume;
solve for the first bound and the second bound;
estimate the constant of proportionality to be an average of the first bound and the second bound; and
solve for the first reference elasticity.

* * * * *